(12) United States Patent
Hirao et al.

(10) Patent No.: US 11,656,202 B2
(45) Date of Patent: May 23, 2023

(54) SONIC INSPECTION DEVICE, SONIC INSPECTION METHOD, AND CONTACT MEMBER

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Akiko Hirao, Kawasaki Kanagawa (JP); Noriko Yamamoto, Yokohama Kanagawa (JP); Tomio Ono, Yokohama Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/462,581

(22) Filed: Aug. 31, 2021

(65) Prior Publication Data
US 2022/0291174 A1   Sep. 15, 2022

(30) Foreign Application Priority Data
Mar. 15, 2021 (JP) .............................. JP2021-041454

(51) Int. Cl.
*G01N 29/04* (2006.01)
*G01N 29/265* (2006.01)

(52) U.S. Cl.
CPC ......... *G01N 29/041* (2013.01); *G01N 29/265* (2013.01)

(58) Field of Classification Search
CPC .......................... G01N 29/041; G01N 29/265
See application file for complete search history.

(56) References Cited

U.S. PATENT DOCUMENTS

| | | | |
|---|---|---|---|
| 2007/0282204 A1* | 12/2007 | Yamashita | G10K 11/02 600/459 |
| 2015/0059479 A1* | 3/2015 | Davis | G01N 29/28 73/644 |
| 2017/0272865 A1 | 9/2017 | Zhao et al. | |
| 2021/0086230 A1* | 3/2021 | Hur | G10K 11/04 |
| 2021/0123890 A1 | 4/2021 | Hirao et al. | |

FOREIGN PATENT DOCUMENTS

| | | |
|---|---|---|
| JP | 2021-067603 A | 4/2021 |
| WO | WO-2017/024704 A1 | 2/2017 |

\* cited by examiner

*Primary Examiner* — Xin Y Zhong
(74) *Attorney, Agent, or Firm* — Foley & Lardner LLP

(57) ABSTRACT

A sonic inspection device of an embodiment includes: a sonic probe which includes a vibrator having at least one of functions of transmitting a sound wave and of receiving a sound wave and which has a sonic function surface functioning as at least one of surfaces for transmitting the sound wave and for receiving the sound wave; a contact member including a couplant and a sheet member, the couplant being in contact with the sonic function surface of the sonic probe directly or through an intermediate member and containing at least an elastomer, and the sheet member being in contact with the couplant and having a plurality of holes; and a loading mechanism which applies/removes a load to/from the contact member. The sheet member has a thickness of not less than 0.15 times nor more than 0.35 times a wavelength λ of the sound wave propagated in the couplant.

23 Claims, 7 Drawing Sheets

SONIC INSPECTION DEVICE, SONIC INSPECTION METHOD, AND CONTACT MEMBER

CROSSREFERENCE TO RELATED APPLICATION

This application is based upon and claims the benefit of priority from Japanese Patent Application No. 2021-041454, filed on Mar. 15, 2021; the entire contents of which are incorporated herein by reference.

FIELD

Embodiments described herein relate to a sonic inspection device, a sonic inspection method, and a contact member.

BACKGROUND

A sonic inspection device using the propagation of a sound wave such as an ultrasonic wave and an elastic wave is used for inspecting various members, devices, infrastructures, and so on. An ultrasonic inspection device is also used for medical diagnosis and the like. In a case where a probe for sonic inspection used in such inspection devices, such as a sonic receiver, a sonic transmitter, or a sonic transceiver represented by an ultrasonic transducer, an AE (Acoustic Emission) sensor, or the like is installed on an object to be inspected, a liquid or viscous couplant such as glycerin or vaseline is interposed between the object to be inspected and a sonic function surface, of the probe, that functions as at least one of surfaces for transmitting a sound wave and for receiving a sound wave so that the sound wave is efficiently propagated between the probe and the object to be inspected.

The aforesaid couplant efficiently transmits the sound wave such as an ultrasonic wave from the probe to the object to be inspected or from the object to be inspected to the probe and is important for increasing test accuracy. However, processes of applying and removing the liquid or viscous couplant are troublesome. This is a factor to increase the inspection time and man-hour. Some object to be inspected may be contaminated by the couplant, which does not allow the inspection itself to be conducted.

A solid couplant has also been proposed, but it is far poorer in ultrasonic propagation than the liquid couplant. A possible reason for this is that, between the couplant of the probe and the object to be inspected, the air whose acoustic impedance is greatly different is present. A solid couplant having tackiness has also been proposed to avoid the presence of the air between an installation surface of a couplant for sonic inspection and an object to be inspected. In this case, however, the installation surface of the couplant for sonic inspection is in close contact with the object to be inspected, and the couplant for sonic inspection cannot be slid. This necessitates once peeling the probe together with the couplant from the object to be inspected even when the installation position has to be moved only by a small distance, leading to the complication of the inspection process. Further, in the case where the transmission of a sound wave from the probe for sonic inspection and the reception of a reflected wave are performed through the couplant, it is required to reduce the attenuation of the sound wave and the reflected wave ascribable to the couplant and reduce a decrease in an S/N ratio caused by multiple reflection or the like.

DETAILED DESCRIPTION

Figure 1:
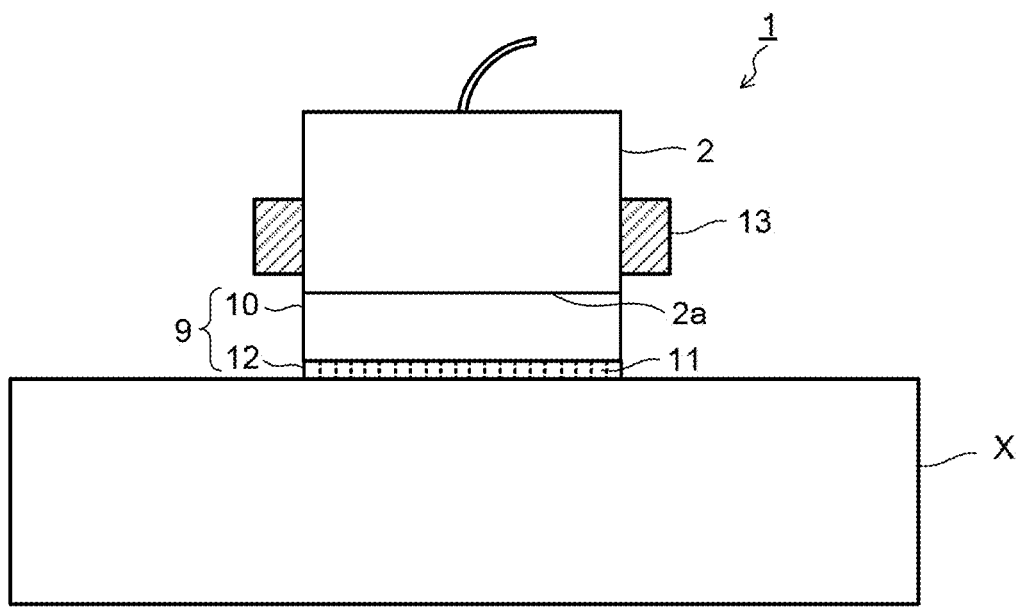
FIG. 1 is a view of a sonic inspection device of an embodiment.

A sonic inspection device of an aspect of an embodiment includes: a sonic probe which includes a vibrator configured to perform at least one of transmitting a sound wave and receiving a sound wave and which has a sonic function surface configuring at least one of a wave transmitting surface of the sound wave and a wave receiving surface of the sound wave; a contact member including a couplant and a sheet member; the couplant having a first surface which is in contact with the sonic function surface of the sonic probe directly or through an intermediate member and a second surface opposite the first surface, and containing at least an elastomer, and the sheet member being in contact with the second surface of the couplant and having a plurality of holes; and a loading mechanism configured to apply a load and to remove the load to/from the contact member. The sheet member in the aspect of the sonic inspection device of the embodiment has a thickness in a range of not less than 0.15 times nor more than 0.35 times a wavelength $\lambda$ of the sound wave propagated in the couplant.

A sonic inspection device of another aspect of the embodiment includes: a sonic probe which includes a vibrator configured to perform at least one of transmitting a sound wave and receiving a sound wave and which has a sonic function surface configuring at least one of a wave transmitting surface of the sound wave and a wave receiving surface of the sound wave; a contact member including a couplant and a sheet member, the couplant having a first surface which is in contact with the sonic function surface of the sonic probe directly or through an intermediate member and a second surface opposite the first surface, and containing at least an elastomer, and the sheet member being in contact with the second surface of the couplant and having a plurality of holes; and a loading mechanism configured to apply a load and to remove the load to/from the contact member. The sheet member in another aspect of the sonic inspection device of the embodiment has the plurality of holes which are arranged such that an interval between a first hole and a second hole adjacent to the first hole out of the plurality of holes is within a range of not less than 0.1 times nor more than 1.5 times a wavelength λ of an ultrasonic wave propagated in the couplant.

A sonic inspection device and a sonic inspection method of embodiments will be hereinafter described with reference to the drawings. Note that, in the embodiments, substantially the same constituent parts are denoted by the same reference signs and a description thereof may be partly omitted. The drawings are schematic, and a relation of the thickness and planar dimension of each part, a thickness ratio among the parts, and so on may be different from actual ones. In the description, a term expressing the up-down direction indicates a relative direction when an inspection surface of an object to be inspected is defined as an upper side and may be different from an actual direction based on a gravitational acceleration direction.

FIG. 1 is a view of the sonic inspection device of the embodiment. The sonic inspection device 1 illustrated in FIG. 1 has a vertical sonic probe 2 and conducts a nondestructive inspection by measuring a sound wave (reflected wave) returning from an object to be inspected such as a flaw or a sound wave generated by the object to be inspected. The sonic probe 2 has at least one of functions of transmitting the sound wave and of receiving the sound wave, and its specific examples include an ultrasonic transceiver and a sonic receiver. Typical examples of the ultrasonic transducer include an ultrasonic probe. Typical examples of the sonic receiver include an AE sensor. The sonic probe 2 may be a sonic transmitter.

The sound wave mentioned here is a generic name of all the elastic vibration waves that are propagated in an elastic body regardless of whether it is gas, liquid, or solid and includes not only a sound wave in an audible frequency range but also an ultrasonic wave having a frequency higher than the audible frequency range, a low-frequency sound wave having a frequency lower than the audible frequency range, and so on. The frequency of the sound wave is not limited and includes high frequencies to low frequencies. In the sonic inspection device 1 of the embodiment, the sonic probe 2 has a surface for transceiving, receiving, or transmitting the sound wave. Here, the surface of the sonic probe 2 functioning as at least one of the surfaces for transmitting and receiving the sound wave will be called a sonic function surface. The sonic probe 2 has the sonic function surface configuring at least one of the wave transmitting surface of the sound wave and the wave receiving surface of the sound wave. The sonic probe 2 includes such a sonic function surface 2a.

Figure 2:
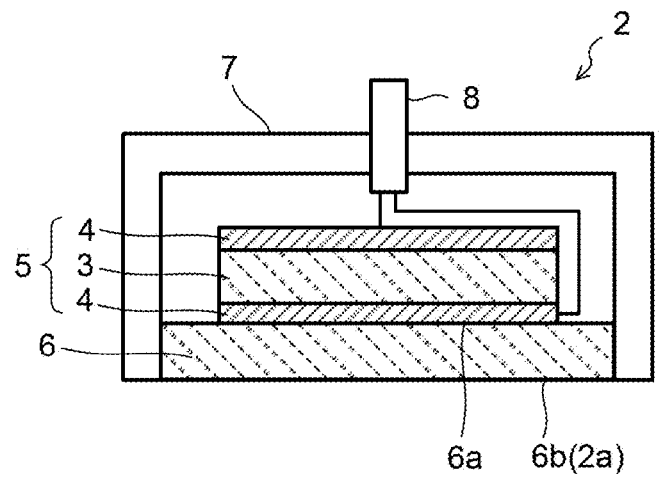
FIG. 2 is a sectional view of a sonic probe in the sonic inspection device illustrated in FIG. 1.

In the sonic inspection device 1 illustrated in FIG. 1, the sonic probe 2 is an ultrasonic probe as an ultrasonic transducer, for instance. As illustrated in FIG. 2, the ultrasonic probe (2) includes an ultrasonic transducer 5 having a vibrator (piezoelectric body) 3 for ultrasonic flaw detection and electrodes 4 provided on an upper and a lower surface of the vibrator 3. The ultrasonic transducer 5 is disposed on a wave receiving plate 6 and is housed in a case 7 in this state. The electrodes 4 of the ultrasonic transducer 5 are electrically connected to a connector 8 provided on the case 7. The constituent materials and structures of the vibrator 3, the ultrasonic transducer 5, the wave receiving plate 6, and so on can be those used in a known ultrasonic probe and are not limited. Further, in a case where the sonic probe 2 is a sonic receiver such as an AE sensor, the same structure as that of the ultrasonic probe is employed except that a sonic receiving element having a vibrator (piezoelectric body) 3 for AE reception is used. In this case, the constituent materials and structures of the vibrator for AE reception, the sonic receiving element, the wave receiving plate 6, and so on may be those of a known AE sensor. The vibrator 3 is configured to perform at least one of transmitting the sound wave and receiving the sound wave.

In the case where the ultrasonic probe is used as the sonic probe 2, a voltage is applied from the electrodes 4 to the vibrator 3 and then an ultrasonic wave is transmitted through the wave receiving plate 6 and a reflected wave of the ultrasonic wave is received through the wave receiving plate 6. In the wave receiving plate 6 of the ultrasonic probe, a surface 6b opposite a surface 6a in contact with the ultrasonic transducer 5 is a surface for transmitting and receiving the ultrasonic wave (transceiving surface). In the case where an AE sensor is employed as the sonic probe 2, the vibrator 3 receives a sound wave (elastic wave) of AE (Acoustic Emission) in the object to be inspected, through the wave receiving plate 6. In the wave receiving plate 6 of the AE sensor, the surface 6b opposite the surface 6a in contact with the sonic receiving element is a surface for receiving the sound wave. In the wave receiving plate 6 of the sonic probe 2, the surface 6b opposite the surface 6a on which the ultrasonic transducer or the sonic receiver (it may be hereinafter referred to as a sonic element as a generic name) 5 is provided and which is in contact with the sonic element 5 is the sonic function surface 2a functioning as at least one of the surfaces for transmitting and receiving the sound wave.

Figure 3:
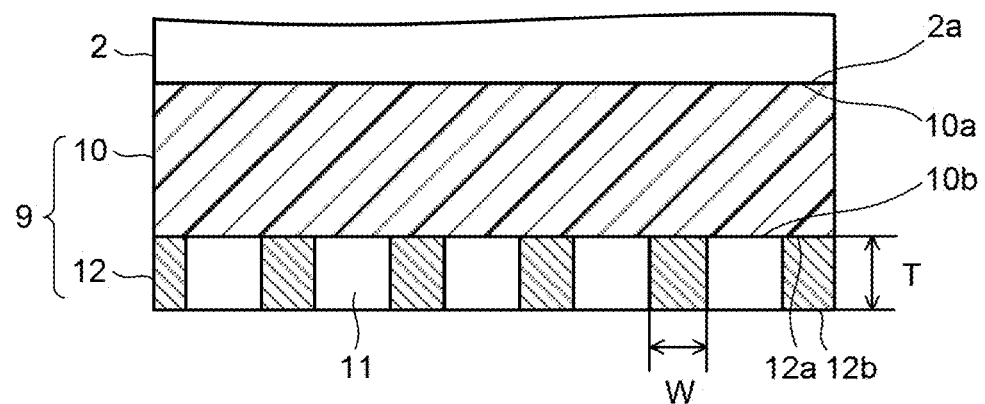
FIG. 3 is an enlarged sectional view of a contact member in the sonic inspection device illustrated in FIG. 1.
Figure 4:
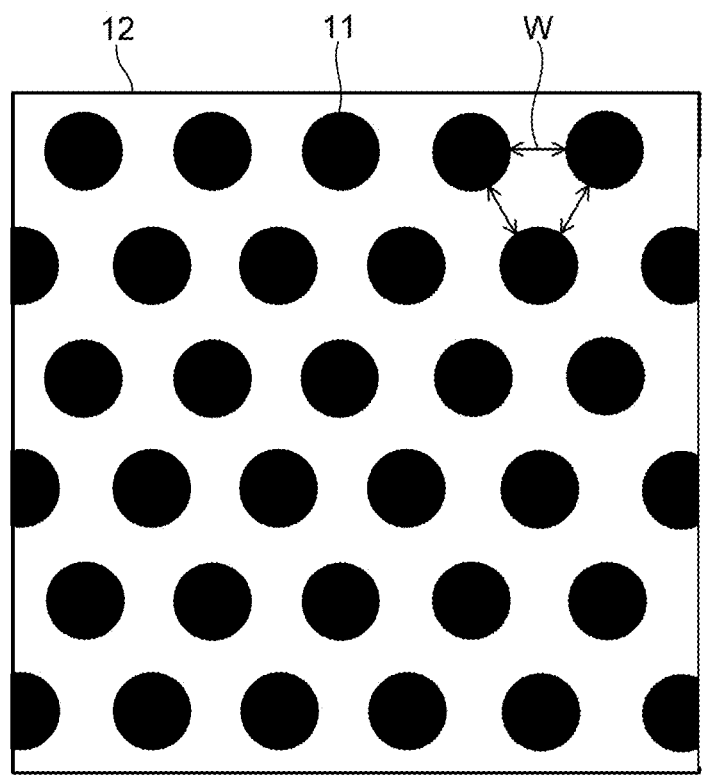
FIG. 4 is a plan view of a first example of a sheet member in the contact member illustrated in FIG. 3.

On the sonic function surface 2a of the sonic probe 2, a contact member 9 functioning as a sonic propagation unit is provided. As illustrated in FIG. 3 and FIG. 4, the contact member 9 includes a couplant 10 containing an elastomer and a sheet member 12 having a plurality of holes 11. FIG. 3 is an enlarged sectional view of the contact member 9, and FIG. 4 is a plan view illustrating the shape and so on of the holes 11 of the sheet member 12. The couplant 10 has a first surface 10a in contact with the sonic function surface 2a of the sonic probe 2 directly or through an intermediate member and a second surface 10b opposite the first surface 10a. The first surface 10a of the couplant 10 is bonded to the sonic function surface 2a of the sonic probe 2 directly or through the intermediate member with a not-illustrated adhesive. Examples of the intermediate member include a shoe made of a polymeric material. The sheet member 12 has a third surface 12a in contact with the second surface 10b of the couplant 10 and a fourth surface 12b opposite the third surface 12a. The third surface 12a of the sheet member 12 is bonded to the second surface 10b of the couplant 10 with a not-illustrated adhesive.

Figure 5:
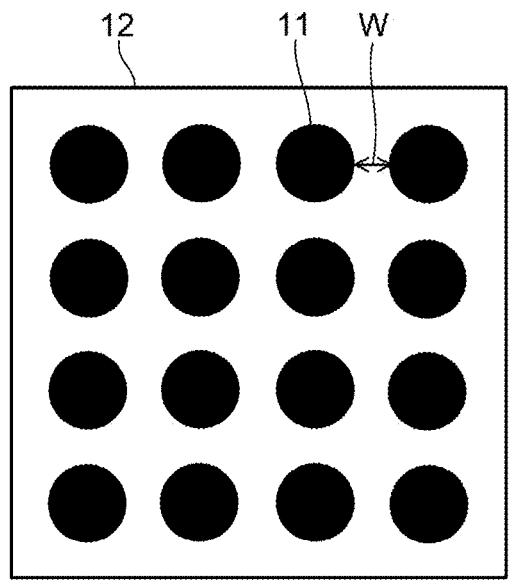
FIG. 5 is a plan view of a second example of the sheet member in the contact member illustrated in FIG. 3.
Figure 6:
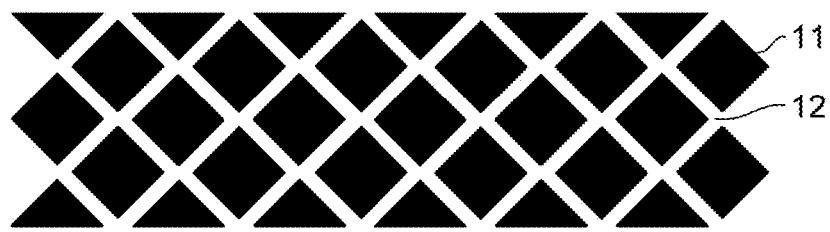
FIG. 6 is a plan view of a third example of the sheet member in the contact member illustrated in FIG. 3.
Figure 7:
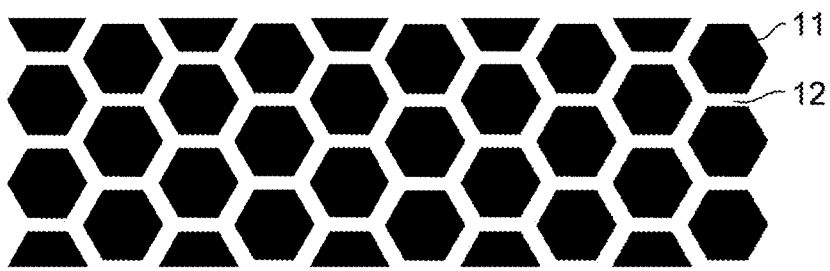
FIG. 7 is a plan view of a fourth example of the sheet member in the contact member illustrated in FIG. 3.
Figure 8:
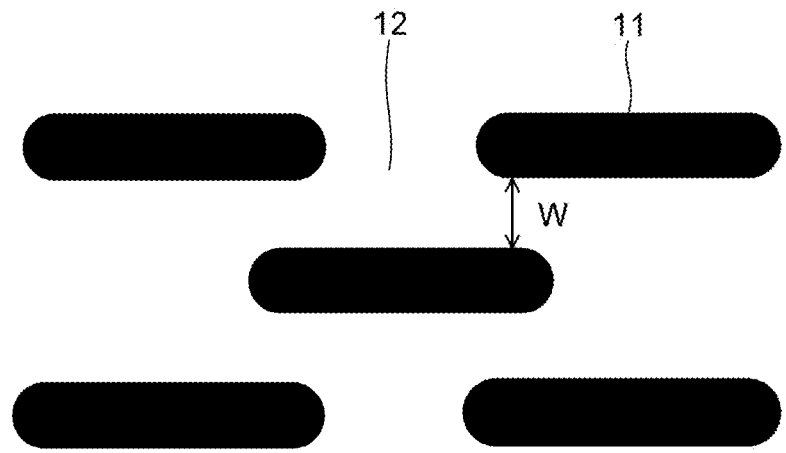
FIG. 8 is a plan view of a fifth example of the sheet member in the contact member illustrated in FIG. 3.
Figure 9:
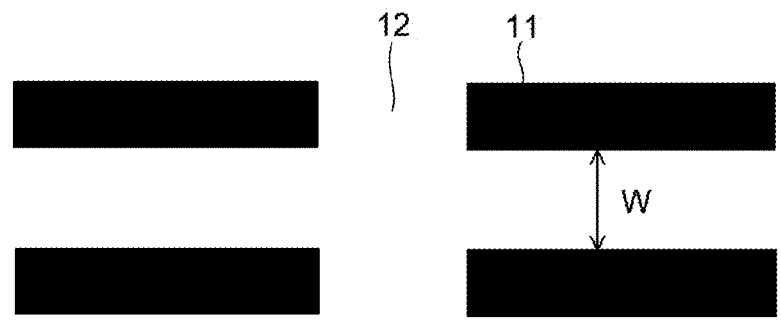
FIG. 9 is a plan view of a sixth example of the sheet member in the contact member illustrated in FIG. 3.

FIG. 4 illustrates the sheet member 12 in which circular holes as the plurality of holes 11 are arranged in a 60° zigzag pattern. In this case, the distance between the adjacent holes 11 is substantially uniform. The arrangement of the holes 11 is not limited to the arrangement illustrated in FIG. 4. For example, as illustrated in FIG. 5, circular holes as the plurality of holes 11 may be arranged in parallel. Further, the arrangement of the circular holes may be a 45° zigzag pattern and so on. The holes 11 are not limited to the circular holes either and may be square holes (quadrangular holes) illustrated in FIG. 6, angular holes such as hexagonal holes (polygonal holes) illustrated in FIG. 7, elliptical holes illustrated in FIG. 8, long angular holes illustrated in FIG. 9, or the like. The arrangement of the angular holes, the elliptical holes, the long angular holes, and so on can also be any of various arrangements such as zigzag arrangement and parallel arrangement. In all of FIG. 4, FIG. 5, FIG. 6, FIG. 7, FIG. 8, and FIG. 9, the black parts indicate the positions of the holes 11 (parts where the holes 11 are formed), and the white parts indicate parts, of the sheet member 12, where the holes 11 are not formed.

The sonic inspection device 1 is disposed with the fourth surface 12b of the sheet member 12 in contact with an object X to be inspected (object to be handled). The sonic inspection device 1 has a load applying jig 13 provided on the outer periphery of the sonic probe 2. In the sonic inspection device 1, a load is first applied to the sonic probe 2 through the load applying jig 13 and the load is further applied to the contact member 9 through the sonic probe 2. As will be described later, the couplant 10 is brought into contact with the object X to be inspected through the holes 11 of the sheet member 12 by the load applied to the contact member 9. This enables the efficient propagation of the sound wave between the couplant 10 and the object X to be inspected, making it possible to accurately conduct the nondestructive inspection of the object X to be inspected. Further, removing the load applied by the load applying jig 10 results in a state in which only the sheet member 12 is in contact with the object X to be inspected, making it possible to move the sonic inspection device 1 while sliding it on the object X to be inspected. This facilitates moving the sonic inspection device 1 to the next inspection position of the object X to be inspected. The application of the load to the couplant 10 can be executed by any of various mechanisms and methods for applying force to the couplant 10. For example, the load can be applied to the couplant 10 by an electromotive actuator using a stepping motor or an AC servomotor, an actuator using oil pressure or pneumatic pressure, or the like.

Figure 10:
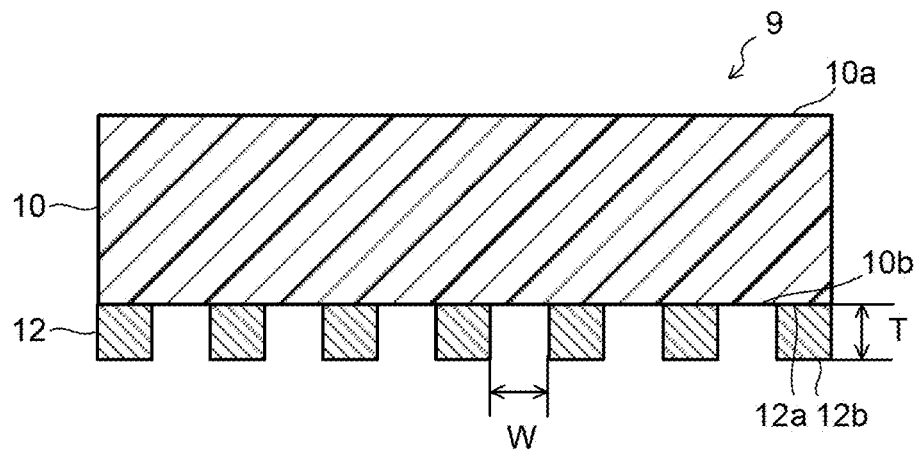
FIG. 10 is a sectional view of the contact member illustrated in FIG. 3 before a load is applied thereto.

The couplant 10 contains at least an elastomer and has the contact surface that is to be in contact with the object X to be inspected. In the absence of the load applied to the contact member 9 by the load applying jig 13, the second surface 10b of the couplant 10 is merely in contact with the third surface 12a of the sheet member 12 as illustrated in FIG. 10. Therefore, the couplant 10 is not in contact with the object X to be inspected, and only the fourth surface 12b of the sheet member 12 is in contact with the object X to be inspected. This state is a state in which the sonic inspection device 1 is merely moved without conducting the sonic inspection. In the state in which only the sheet member 12 is in contact with the object X to be inspected, it is possible to move the sonic inspection device 1 while sliding it on the object X to be inspected with the sheet member 12 therebetween, owing to the later-described slipperiness and the like based on the constituent material of the sheet member 12.

Figure 11:
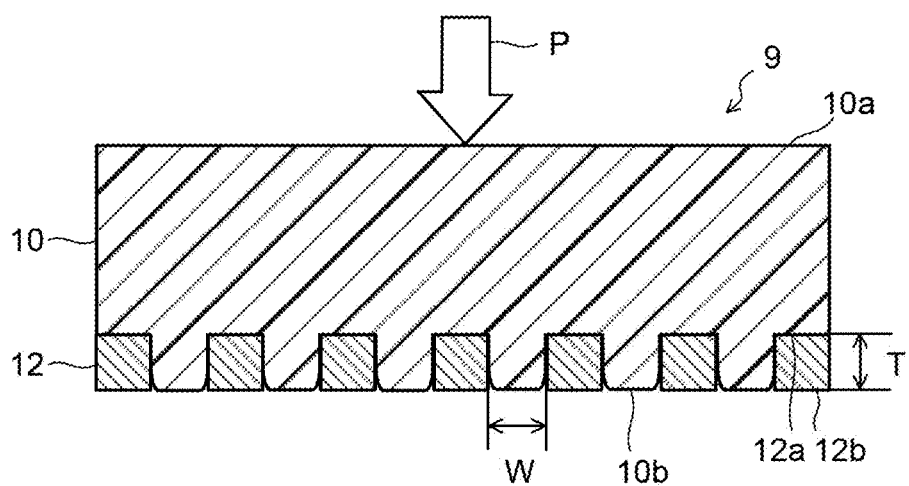
FIG. 11 is a sectional view of the contact member when a load is applied thereto.

On the other hand, as illustrated in FIG. 11, in the state in which the load P is applied to the contact member 9 by the load applying jig 13, the couplant 10 deforms to be partly filled in the holes 11 of the sheet member 12 owing to the deforming properties of the couplant 10 containing at least the elastomer, that is, owing to its ultra-low modulus of elasticity, large reversible deformation, viscoelasticity, and so on. By thus being deformed by the applied load, the couplant 10 partly comes into contact with the object X to be inspected. The elastomer having tackiness is capable of well propagating a sound wave such as an ultrasonic wave similarly to a liquid couplant. Therefore, bringing part of the couplant 10 into contact with the object X to be inspected achieves the efficient propagation of the sound wave between the couplant 10 and the object X to be inspected when the load P is applied. Owing to these, an accuracy improvement of the nondestructive inspection of the object X to be inspected by the sonic inspection device 1 and the movability of the sonic inspection device 1 on the object X to be inspected are both achieved.

When the frictional force of an elastomer is measured, friction overwhelmingly larger than those of other materials and in some case, exceeding 1 is sometimes observed. This large frictional force is ascribable to the adsorption force of the elastomer to the object X to be inspected which force originates in Van der Waals force, and this is a phenomenon observed because the deformation greatly increases the contact area. Even if an attempt is made to bring hard materials such as metals into contact with each other, only irregularities being very small parts of their contact surfaces, specifically, tips of minute projections of the contact surfaces come into contact. On the other hand, in the case where the modulus of elasticity is low as in an elastomer, the contact area is larger even under the same load, so that the adsorption force increases according to the contact area. Further, the viscoelasticity of the elastomer acts to increase force for peeling adsorption interfaces that are in contact, which is also a factor to make a coefficient of friction large. Thus having a large practical (microscopical) contact area with the object X to be inspected, the elastomer can transmit an ultrasonic wave well. However, one that more easily transmits the ultrasonic wave has a larger frictional force and is more difficult to peel off. Therefore, in the contact member 9, the sheet member 12 having the holes 11 is provided on the surface 10b of the couplant 10 as illustrated in FIG. 3, thereby facilitating the movement when the load is not applied.

The elastic constant (Young's modulus) of the elastomer used as the couplant 10 is preferably not less than 0.1 MPa nor more than 10 MPa. Examples of a thermoplastic elastomer forming the couplant 10 include a polystyrene-based thermoplastic elastomer (SBC, TPS), a polyolefin-based thermoplastic elastomer (TPO), a vinyl chloride-based thermoplastic elastomer (TPVC), a polyurethane-based thermoplastic elastomer (TPU), a polyester-based thermoplastic elastomer (TPEE TPC), and a polyamide-based thermoplastic elastomer. Examples of a thermosetting elastomer include styrene-butadiene rubber (SBR), isoprene rubber (IR), butadiene rubber (BR), chloroprene rubber (CR), and acrylonitrile-butadiene rubber (NBR) which are classified as diene-based rubber, and butyl rubber such as isobutylene-isoprene rubber (IIR), ethylene-propylene rubber (EPM), ethylene-propylene-diene rubber (EPDM), urethane rubber (U), silicone rubber, and fluorine rubber (FKM) which are classified as non-diene rubber. Examples of other rubber include chlorosulfonated polyethylene (CSM), chlorinated polyethylene (CM), acrylic rubber (ACM), polysulfide rubber (I), and epichlorohydrin rubber (CO, ECO). Since these materials have different properties such as heat resistance, abrasion resistance, oil resistance, chemical resistance, and so on, it is preferable to select an appropriate material as required for each object to be inspected. Depending on the use, a mixture of a plurality of elastomers may be used. An additive having a size not preventing the transmission of a sound wave, that is, having a diameter of approximately 200 μm or less may be mixed.

As a material forming the sheet member 12, a material larger in modulus of elasticity than the elastomer forming the couplant 10 is used, and for example, a hard resin material, a metal material, a ceramic material, or a compound material such as an oxide is usable. The material of the sheet member 12 is preferably larger in modulus of elasticity than the elastomer forming the couplant 10 and excellent in slipperiness. The property of the sheet member 12 to propagate the sound wave need not be considered because, in the contact member 9, mainly the couplant 10 is responsible for the propagation of a sound wave such as an ultrasonic wave.

The constituent material of the couplant 10 may include a slide-ring elastomer. This is intended to lower the Young's modulus of the elastomer and reduce hysteresis. The slide-ring elastomer is a slide-ring polymeric material represented by a polyrotaxane structure which is known as having a very low Young's modulus. In a rotaxane, a rod-shaped molecule penetrates through a macrocycle and bulky parts are bonded to the ends of its axle to prevent the ring from coming off the axle because of steric hindrance. Its structural features are classified into the following three. That is, (1) no covalent bond is present between the cyclic molecule and the linear macromolecule, (2) a large number of cyclic molecules are capable of rotating and slipping along the linear macromolecule, and (3) a function can be imparted by chemical modification of the cyclic molecules in polyrotaxane.

The raw material of the aforesaid slide-ring elastomer is suitably polyrotaxane that uses polyethylene glycol as the axle molecule, uses a cyclodextrin derivative as the cyclic molecule, and uses adamantane as the capping molecules. In particular, an elastomer in which polycaprolactone or the like is grafted to the polyrotaxane and another high molecule is blended for crosslinking has a very low modulus of elasticity of about 1 kPa. The use of such an elastomer as the constituent material enables a further increase in the followability to the surface of the object X to be inspected having irregularities. Further, since the hysteresis is also reduced, the number of times it is continuously used can be increased.

In the state in which the couplant 10 is partly brought into contact with the object X to be inspected by the applied load as described above, when an ultrasonic wave or the like is transmitted to the object X to be inspected from the sonic element 5, the ultrasonic wave is propagated in the couplant 10, further reaches the object X to be inspected through a contact interface between the couplant 10 and the object X to be inspected, and is propagated inside the object X to be inspected. At this time, the ultrasonic wave is partly reflected by the sheet member 12 and this unnecessary reflected wave may form a multiple reflected wave with a reflected wave reflected by a flaw or the like in the object X to be inspected. Such a multiple reflected wave is a factor to deteriorate signal properties of the reflected wave reflected by the flaw or the like in the object X to be inspected. That is, it is a factor to decrease an S/N ratio of a signal of the reflected wave that should be detected. Therefore, in the sonic inspection device 1 of this embodiment, the thickness of the sheet member 12 (thickness T indicated in FIG. 3) is set within a range of not less than 0.15 times nor more than 0.35 times a wavelength $\lambda$ of the ultrasonic wave propagated in the couplant 10.

The use of the sheet member 12 whose thickness is within the range of not less than $0.15\lambda$ nor more than $0.35\lambda$ with respect to the ultrasonic wave (wavelength $\lambda$) propagated in the couplant 10 enables a reduction in the multiple reflection of the reflected waves in the couplant 10. For example, if the thickness of the sheet member 12 is $0.25\lambda$ (¼ $\lambda$), half-wave phases deviate to cancel each other, enabling the reduction in the multiple reflection. Setting the thickness of the sheet member 12 within the range of not less than $0.15\lambda$ nor more than $0.35\lambda$ can produce such an effect of reducing the multiple reflection more effectively than setting the thickness of the sheet member 12 to less than $0.15\lambda$ or more than $0.35\lambda$. The thickness of the sheet member 12 is more preferably within a range of not less than $0.2\lambda$ nor more than $0.3\lambda$. The aforesaid effect of reducing the multiple reflection can be obtained not only for the ultrasonic wave but also for sound as a whole, and can also be obtained for sound emitted from the object X to be inspected to reach the sonic element 5.

Further, for reducing the aforesaid multiple reflection, attenuation, and so on due to the sheet member 12, it is also effective to adjust the closest interval between the holes 11 provided in the sheet member 12. Specifically, as illustrated in, for example, FIG. 3 and FIG. 4, it is effective to set an interval (closest interval) W between a first hole 11A and a second hole 11B adjacent to the first hole 11A out of the plurality of holes 11 to a value within a range of not less than 0.1 times nor more than 1.5 times the wavelength $\lambda$ of the ultrasonic wave propagated in the couplant 10. Further, it is preferable to set the interval (closest interval) W of each of the plurality of holes 11 from the adjacent hole 11 to a value within the range of not less than $0.1\lambda$ nor more than $1.5\lambda$. Thus setting the closest interval W between the holes 11 within the range of not less than $0.1\lambda$ nor more than $1.5\lambda$ facilitates the passage of the ultrasonic wave propagated in the couplant 10, making it possible to reduce the multiple reflection of the reflected waves in the couplant 10 and the attenuation of the sound wave due to the sheet member 12. The closest interval \V between the holes 11 provided in the sheet member 12 is more preferably within a range of not less than $0.1\lambda$ nor more than $1\lambda$. Such an effect of reducing the multiple reflection of the ultrasonic waves or the like and the attenuation due to the sheet member 12 can be obtained not only for the ultrasonic wave but also for sound as a whole, and can also be obtained for sound emitted from the object X to be inspected to reach the sonic element 5.

In the case where one of the configuration in which the thickness of the sheet member 12 is within the range of not less than $0.15\lambda$ nor more than $0.35\lambda$ and the configuration in which the closest interval W between the holes 11 is within the range of not less than $0.1\lambda$ nor more than $1.5\lambda$ is employed, it is also possible to reduce the multiple reflection and the attenuation due to the sheet member 12. For reducing the multiple reflection and the attenuation due to the sheet member 12 to more increase the S/N ratio of the sonic signal received by the sonic element 5, it is preferable to employ both the configuration in which the thickness of the sheet member 12 is within the range of not less than $0.15\lambda$ nor more than $0.35\lambda$ and the configuration in which the interval W between the holes 11 is within the range of not less than $0.1\lambda$ nor more than $1.5\lambda$.

In the sonic inspection device 1 of the embodiment, the thickness of the couplant 10 is preferably not less than 10 μm nor more than 10 mm. An appropriate thickness differs depending on the acoustic impedance and the Young's modulus of the material forming the couplant 10, but setting the thickness to about not less than 0.5 mm nor more than 2 mm can further increase the sound wave propagating performance. The elastomer used in the embodiment has a certain viscoelasticity and can stick to a target and thus contaminates the surroundings less than other couplants such as water and oils, and since it is solid, it can be easily removed and is reusable. In order to eliminate an air layer by pressing the couplant 10, the elastic constant (Young's modulus) of the used elastomer is preferably not less than 0.1 MPa nor more than 0.1 GPa.

Further, in the sheet member 12 of the contact member 9 illustrated in FIG. 3 to FIG. 9, the total area of the holes 11

(the area of the black parts in FIG. 4 to FIG. 9) is preferably equal to or more than the area of the parts where the holes 11 are not formed (the area of the white parts in FIG. 4 to FIG. 9). This makes the contact area between the couplant 10 and the object X to be inspected sufficiently large to enhance the accuracy of sonic inspection such as ultrasonic inspection. Further, preferably, the thickness of the sheet member 12, the minimum width of the parts, of the sheet member 12, where the holes 11 are not formed, a ratio between the total area of the holes 11 in the sheet member 12 and the area of the parts, of the sheet member 12, where the holes 11 are not formed, and so on are appropriately selected according to the Young's modulus, the acoustic impedance, and so on of the material used for the couplant 10.

EXAMPLES

Examples and their evaluation results will be hereinafter described.

Example 1, Comparative Example 1

First, as elastomer sheets, styrene-butadiene elastomers (they contain a process oil and have a JIS type E hardness of 4, and a sonic speed under an experimental condition is 1350 m/s) were prepared. Next, polymer sheets having a thickness of 150 µm corresponding to a length 0.25 times a wavelength λ of a 2.25 MHz-frequency ultrasonic wave in the aforesaid elastomers were prepared. Holes with a 100 µm diameter were formed with various pitches (closest distances) in the whole surfaces of these sheets. The sheets having the holes therein were each brought into close contact with the elastomer sheet to form a contact member. The aforesaid elastomer sheets of the contact members were each pasted on the surface of a 2.25 MHz-frequency ultrasonic transducer, with its surface to which the sheet member (polymer sheet) was not pasted facing the ultrasonic transducer.

First, a shear tensile test was conducted to examine whether or not the ultrasonic transducers could be moved while having only their own weight without a load further applied thereto. A load cell was connected to each of the ultrasonic transducers and the resultant was placed on a stainless plate having a surface roughness Rz of 32 µm, the stainless plate was moved at a low speed, and a static friction coefficient was measured. As a comparative example, the same measurement was conducted only on an elastomer sheet on which the sheet member was not pasted. As a result, in the case where the sheet member was not pasted, the static friction coefficient was very high and it was difficult to move the probe. On the other hand, in the case where the sheet member was pasted, it was found out that the static friction coefficient was uniformly small and it was possible to move the ultrasonic transducer. However, in the case where the closest distance between the holes was a 0.1 wavelength or less (in this example, 60 µm or less), it was confirmed that the elastomer projected from the surface of the sheet member, and it was difficult to smoothly move the ultrasonic transducer.

Figure 12:
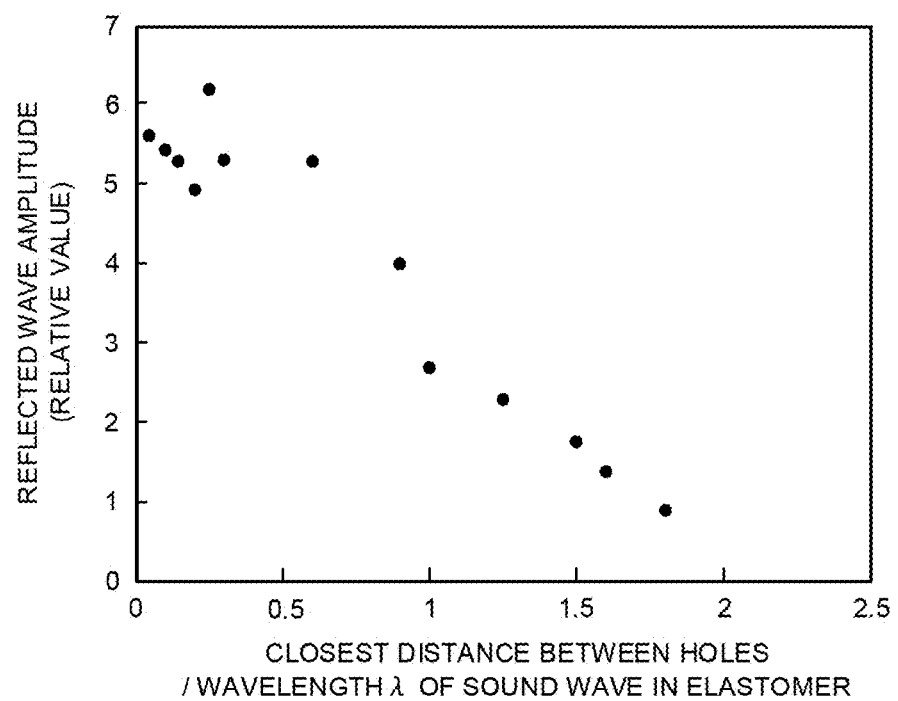
FIG. 12 is a chart illustrating the dependence of a reflected wave amplitude on a ratio of the closest distance between holes to the wavelength of a sound wave in a sonic inspection device of Example 1.

Next, an ultrasonic flaw detection test was conducted. First, a carbon steel block having a 300 mm length was prepared. The surface roughness Rz of an ultrasonic incident surface was 18 µm, and the surface roughness Rz of a surface to which the ultrasonic wave returned was 1.6 µm. The flaw detection test was conducted under the condition that a load was applied by an actuator and the ultrasonic transducers were each pressed with a 0.15 MPa pressure against the carbon steel block. FIG. 12 illustrates the obtained result, that is, the dependence of a reflected wave amplitude on the closest distance (normalized by the wavelength λ) between the holes. For the smooth movement of the ultrasonic transducer, it is seen that the closest distance between the holes formed in the sheet member is preferably 0.1 times the wavelength λ or more, and in consideration of the amplitude of the reflected wave, the closest distance between the holes is preferably 1.5 times the wavelength λ or less.

Example 2, Comparative Example 2

Elastomer sheets of polystyrene-poly(ethylene-butylene)-polystyrene (they each had paraffin, and a sonic speed under an experimental condition was 1350 m/s) with a 2 mm thickness were prepared. Holes with a 100 µm diameter were formed in the whole surfaces of polymer sheets with various thicknesses such that the closest interval between the holes was 50 µm. The polymer sheets in which the holes were formed were each brought into close contact with the elastomer sheet to form a contact member. The elastomer sheets of the aforesaid contact members were each pasted on a surface of a 2.25 MHz-frequency ultrasonic transducer, with its surface on which the sheet member (polymer sheet) was not pasted facing the ultrasonic transducer.

First, a shear tensile test was conducted to examine whether or not the ultrasonic transducers could be moved while having only their own weight without a load further applied thereto. A load cell was connected to each of the ultrasonic transducers and the resultant was placed on a stainless plate having a surface roughness Rz of 32 µm, the stainless plate was moved at a low speed, and a static friction coefficient was measured. As a comparative example, the same measurement was conducted only on an elastomer sheet on which the sheet member was not pasted. As a result, in the case where the sheet member was not pasted, the static friction coefficient was very high and it was difficult to move the ultrasonic transducer. On the other hand, in the case where the sheet member was pasted, it was seen that the static friction coefficient was uniformly small and it was possible to move the ultrasonic transducer.

Figure 13:
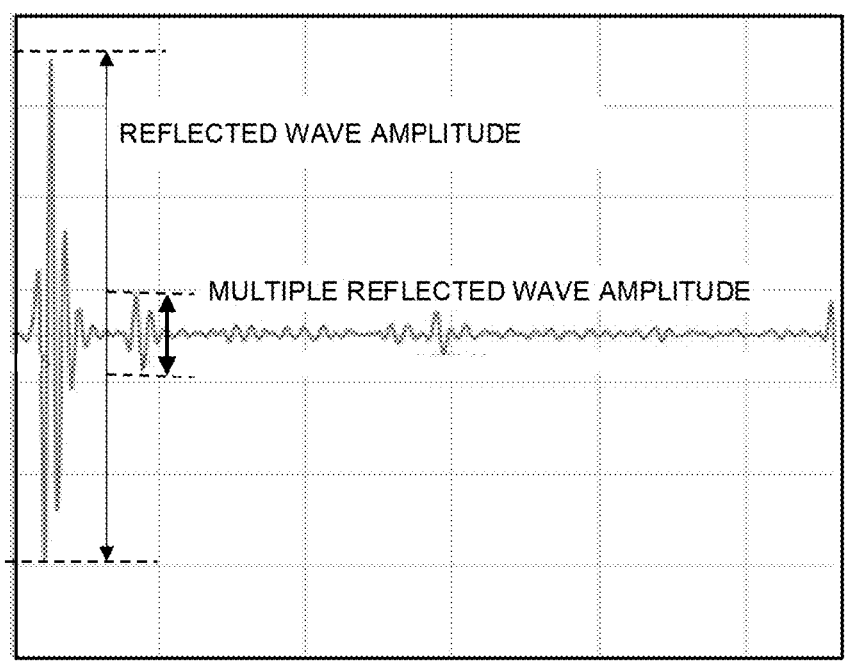
FIG. 13 is a chart illustrating an amplitude of a reflected wave and an amplitude of a multiple reflected wave in an ultrasonic inspection conducted using a sonic inspection device of Example 2.
Figure 14:
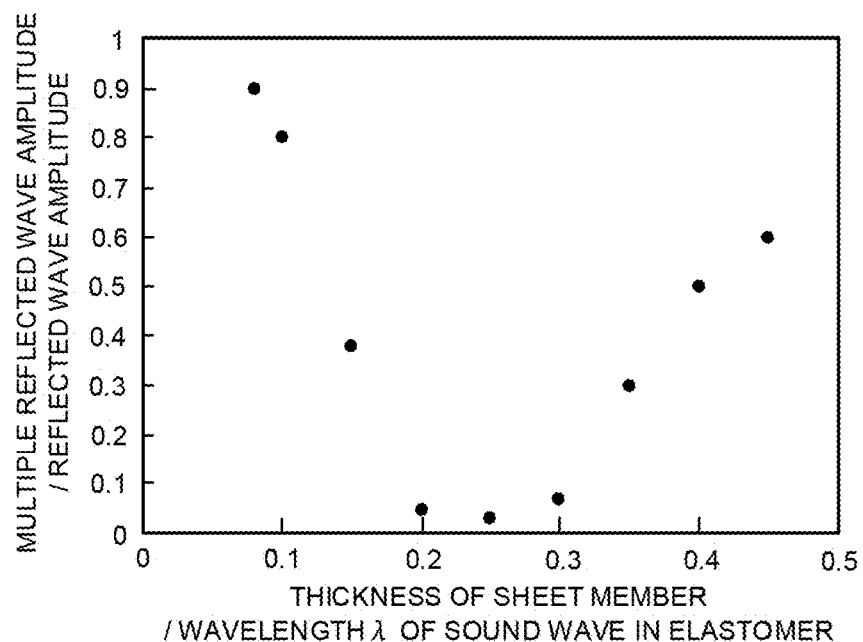
FIG. 14 is a chart illustrating the dependence of a ratio of the multiple reflected wave amplitude to the reflected wave amplitude on a ratio of the thickness of the sheet member to the wavelength of a sound wave in the sonic inspection device of Example 2.

Next, an ultrasonic flaw detection test was conducted. A carbon steel block having a 300 mm length was prepared. The surface roughness Rz of an ultrasonic incident surface was 18 µm, and the surface roughness Rz of a surface to which the ultrasonic wave returned was 1.6 µm. The flaw detection test was conducted under the condition that a load was applied by an actuator and the ultrasonic transducers were each pressed with a 0.15 MPa pressure against the carbon steel block. FIG. 13 and FIG. 14 illustrate the obtained results. FIG. 13 illustrates how a multiple reflected wave amplitude normalized by the reflected wave amplitude defined in FIG. 12 changes depending on the thickness of the sheet member. The multiple reflected wave amplitude normalized by the reflected wave amplitude is desirably 0.5 or less. To obtain such a multiple reflected wave amplitude, it is seen that the thickness of the sheet member is preferably not less than 0.15 times nor more than 0.35 times the wavelength λ in the elastomer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sonic inspection device comprising:
a sonic probe which includes a vibrator configured to perform at least one of transmitting a sound wave or receiving a sound wave and which has a sonic function surface configuring at least one of a wave transmitting surface of the sound wave or a wave receiving surface of the sound wave;
a contact member including a couplant and a sheet member, the couplant having a first surface which is in contact with the sonic function surface of the sonic probe directly or through an intermediate member and a second surface opposite the first surface, and the sheet member being in contact with the second surface of the couplant and having a plurality of holes; and
a loading mechanism configured to apply a load and to remove the load to/from the contact member,
wherein the sheet member has a thickness in a range of not less than 0.15 times nor more than 0.35 times a wavelength λ of the sound wave propagated in the couplant, and
the couplant contains at least an elastomer, and the sheet member contains a hard material larger in modulus of elasticity than the elastomer, and the hard material includes at least one selected from the group consisting of a hard resin material, a metal material, a ceramic material, and a compound material.

2. The device according to claim 1, wherein the sheet member has the plurality of holes that are arranged such that a closest interval between a first hole and a second hole adjacent to the first hole, out of the plurality of holes, is within a range of not less than 0.1 times nor more than 1.5 times the wavelength λ of the sound wave.

3. The device according to claim 1, wherein the plurality of holes of the sheet member are arranged such that a closest interval between each pair of adjacent holes out of the plurality of holes is within a range of not less than 0.1 times nor more than 1.5 times the wavelength λ of the sound wave.

4. The device according to claim 1, wherein the elastomer has a Young's modulus of not less than 0.1 MPa nor more than 10 MPa.

5. The device according to claim 1, wherein a total area of the plurality of holes in the sheet member is equal to or more than an area of a part, of the sheet member, where the plurality of holes are not formed.

6. The device according to claim 1, wherein the vibrator is an ultrasonic transducer.

7. The device according to claim 1, wherein
the loading mechanism is configured to fill a part of the couplant in the plurality of holes of the sheet member by the load.

8. A sonic inspection device comprising:
a sonic probe which includes a vibrator configured to perform at least one of transmitting a sound wave or receiving a sound wave and which has a sonic function surface configuring at least one of a wave transmitting surface of the sound wave or a wave receiving surface of the sound wave;
a contact member including a couplant and a sheet member, the couplant having a first surface which is in contact with the sonic function surface of the sonic probe directly or through an intermediate member and a second surface opposite the first surface, and the sheet member being in contact with the second surface of the couplant and having a plurality of holes; and
a loading mechanism configured to apply a load and to remove the load to/from the contact member,
wherein the sheet member has the plurality of holes which are arranged such that a closest interval between a first hole and a second hole adjacent to the first hole out of the plurality of holes is within a range of not less than 0.1 times nor more than 1.5 times a wavelength λ of the sound wave propagated in the couplant, and
the couplant contains at least an elastomer, and the sheet member contains a hard material larger in modulus of elasticity than the elastomer, and the hard material includes at least one selected from the group consisting of a hard resin material, a metal material, a ceramic material, and a compound material.

9. The device according to claim 8, wherein the plurality of holes of the sheet member are arranged such that a closest interval between each pair of adjacent holes out of the plurality of holes is within the range of not less than 0.1 times nor more than 1.5 times the wavelength λ of the sound wave.

10. The device according to claim 8, wherein the elastomer has a Young's modulus of not less than 0.1 MPa nor more than 10 MPa.

11. The device according to claim 8, wherein a total area of the plurality of holes in the sheet member is equal to or more than an area of a part, of the sheet member, where the plurality of holes are not formed.

12. The device according to claim 8, wherein the vibrator is an ultrasonic transducer.

13. The device according to claim 8, wherein
the loading mechanism is configured to fill a part of the couplant in the plurality of holes of the sheet member by the load.

14. A sonic inspection method comprising:
disposing a sonic probe which includes a vibrator configured to perform at least one of transmitting a sound wave or receiving a sound wave and which has a sonic function surface configuring at least one of a wave transmitting surface of the sound wave or a wave receiving surface of the sound wave, on an object to be inspected, while a contact member including a couplant in contact with the sonic function surface directly or through an intermediate member and a sheet member in contact with the couplant and having a plurality of holes is interposed between the sonic probe and the object to be inspected, such that the sheet member comes into contact with the object to be inspected;
applying a load to the contact member and pressing the couplant to bring the couplant into contact with the object to be inspected through the plurality of holes of the sheet member; and
conducting a nondestructive inspection of the object to be inspected with the sonic probe using a sound wave while pressing the contact member against the object to be inspected,
wherein the sheet member has at least one of a thickness in a range of not less than 0.15 times nor more than 0.35 times a wavelength λ of the sound wave propagated in the couplant and the plurality of holes that are arranged such that a closest interval between a first hole and a second hole adjacent to the first hole out of the plurality of holes is within a range of not less than 0.1 times nor more than 1.5 times the wavelength λ of the sound wave, and the couplant contains at least an elastomer, and the sheet member contains a hard material larger in modulus of elasticity than the elastomer, and the hard material includes at least one selected from the group consisting of a hard resin material, a metal material, a ceramic material, and a compound material.

15. The method according to claim 14, wherein the conducting the inspection includes conducting the nondestructive inspection of the object to be inspected by transmitting an ultrasonic wave used as the sound wave from the sonic probe to the object to be inspected and receiving a reflected wave from the object to be inspected by the sonic probe.

16. The method according to claim 14, further comprising:
    removing the load; and
    canceling a state in which the couplant from which the load is removed is in contact with the object to be inspected, and moving the sonic probe on the object to be inspected while the sheet member is in contact with the object to be inspected.

17. The method according to claim 14, wherein the elastomer has a Young's modulus of not less than 0.1 MPa nor more than 10 MPa.

18. The method according to claim 14, wherein a total area of the plurality of holes in the sheet member is equal to or more than an area of a part, of the sheet member, where the plurality of holes are not formed.

19. The method according to claim 14, wherein
    the applying the load is conducted so that a part of the couplant is filled in the plurality of holes of the sheet member by the load.

20. A contact member used for a sonic probe of a sonic inspection device, the contact member comprising:
    a couplant; and a sheet member in contact with the couplant and having a plurality of holes,
    wherein the sheet member has at least one of a thickness in a range of not less than 0.15 times nor more than 0.35 times a wavelength $\lambda$ of a sound wave propagated in the couplant and the plurality of holes that are arranged such that a closest interval between a first hole and a second hole adjacent to the first hole out of the plurality of holes is within a range of not less than 0.1 times nor more than 1.5 times the wavelength $\lambda$ of the sound wave, and
    the couplant contains at least an elastomer, and the sheet member contains a hard material larger in modulus of elasticity than the elastomer, and the hard material includes at least one selected from the group consisting of a hard resin material, a metal material, a ceramic material, and a compound material.

21. The member according to claim 20, wherein the sheet member has both the thickness in the range of not less than 0.15 times nor more than 0.35 times the wavelength $\lambda$ of the sound wave and the plurality of holes that are arranged such that the closest interval is within the range of not less than 0.1 times nor more than 1.5 times the wavelength $\lambda$ of the sound wave.

22. The member according to claim 20, wherein the elastomer has a Young's modulus of not less than 0.1 MPa nor more than 10 MPa.

23. The member according to claim 20, wherein a total area of the plurality of holes in the sheet member is equal to or more than an area of a part, of the sheet member, where the plurality of holes are not formed.

* * * * *